Patented Oct. 17, 1939

2,176,837

UNITED STATES PATENT OFFICE 2,176,837

FIBER-GLASS-CONTAINING PLASTIC

Carleton Ellis, Montclair, N. J., assignor to Ellis-Foster Company, a corporation of New Jersey No Drawing. Application December 14, 1936,
Serial No. 115,812

5 Claims. (Cl. 49—92)

This invention relates to fiber glass-plastic compositions and particularly to plastics having glass suspended in the resin medium.

An object of this invention is to prepare resin-glass compositions to which the glass contributes novel decorative properties.

Another object of this invention is to prepare resin-glass compositions in which the glass lends mechanical strength and hardness to the resin composition.

The term fiber glass is meant to include glass which has been pulled into very thin threads; also coarse threads of glass as well as threads which have been broken up mechanically.

In certain respects inorganic glasses have certain analogous properties to organic plastics. Some of the organic plastics have been termed "organic glasses," in order to indicate clarity and freedom from flaws. Moreover plastics in certain stages of their preparation can also be pulled into long threads again superficially resembling the inorganic fiber glass. Beyond this resemblance in clarity and semblance of viscosity, the analogy ends. Glass is insoluble but fusible whereby plastics may be divided into two classes, one insoluble and infusible and the second soluble and fusible.

Due to this incompatibility of gross properties, the incorporation of glass with plastics has to be conducted in certain ways.

First the glass may be incorporated into the finished resin or second the glass may be added to the resin ingredients in the unpolymerized state and the resin ingredients polymerized.

One of the methods of incorporating the glass into the finished resin is to dissolve the resin in an appropriate solvent, add the glass and then remove the volatile solvent. Plasticizers, softeners and the like may be added to the solvent. Obviously this method is limited to those resins which are soluble. Infusible and insoluble resins can not be treated in this manner.

In the preparation of glass-resin compositions by dissolving the resin in a solvent, adding glass, and evaporating the solvent, various novel decorative effects may be produced from a matted textured finish to a clear transparent medium.

*Example 1.*—A 15 per cent solution of nitrocellulose in butyl acetate was treated with 0.5 of 1 per cent of glass fiber cut into lengths of 0.5 cm. or less. A clear film resulted on drying. In the film, glass particles could be seen imbedded in the resin mass. Addition of 2 per cent of dibutyl phthalate as plasticizer for the nitrocellulose yielded a clear film in which the imbedded glass particles could not be observed macroscopically. Microscopically certain of the fibers could be rendered visible especially if a semi-dark field were used. Naturally with different specimens of glass the proportion of plasticizer will have to be adjusted in order to insure the absence of streaks of glass.

*Example 2.*—To a 15 per cent solution of nitrocellulose in butyl acetate treated with 3 per cent of benzyl acetate as plasticizer, was added 0.5 of 1 per cent of glass fiber cut into lengths of 0.5 cm. or less. The film on drying revealed that the glass fibers were visible in the resin mass. Certain of the glass particles, moreover, showed a pronounced prismatic effect, especially when held up to a point source of light.

It was found that in certain instances the decorative effect could be enhanced by allowing the solution containing glass to flow by gravity. Under these conditions, the short glass fibers oriented themselves parallel to the direction of the flow of the solution.

*Example 3.*—Three parts of cellulose acetate were dissolved in a mixture of 20 parts of ethylene chlorohydrin and 5 parts of dioxan. Six-tenths of a part of glass fiber was added. This solution on drying to a film yielded an opaque mass. The glass had matted to a textured-like surface.

*Example 4.*—Three parts of cellulose acetate were dissolved in a solvent mixture consisting of 30 parts of ethylene chlorohydrin, 20 parts of dioxan and 5 parts of triethyl citrate, and treated with 0.6 part of glass fiber cut in short lengths. The solution was applied with a brush and yielded a film on drying in which the glass particles were barely visible.

*Example 5.*—Polymethyl methacrylate resin which had been prepared by polymerizing methyl methacrylate at 100° C., was dissolved in acetone and diluted with equal volume of dioxan and treated with glass fiber in short lengths. A clear film was formed in which the glass particles formed a webbed mass.

The clear film of resin containing invisible glass fibers either woven or matted, sealed between glass plates could be used as a resin structure in laminated glass.

In the above examples use was made of glass fibers of rather short length. Fiber glass ground in a ball mill is also serviceable.

*Example 6.*—A drying oil alkyd resin, 1 part (made up from 92 parts of glycerol, 148 parts of phthalic anhydride, 140 parts of tung oil, and 140 parts of linseed oil acids) was dissolved in 1 part of xylol and 1 part of glass was added. The mass was placed in a ball mill and ground. During the grinding an additional part of xylol solution was added. On the initial formation of a film of the above mixture a pronounced blue refraction could be noted. This blue coloration indicated that the glass was colloidally dispersed in the mass. On baking a hard opaque film resulted.

A finely divided glass powder was prepared by grinding glass fiber in a ball mill. This glass powder could be dusted on a resin surface while moist. Similarly very short lengths of glass fiber could also be dusted.

*Example 7.*—Diethylene glycol maleate resin dissolved in a 25 per cent solution of dioxan was treated with 0.5 of 1 per cent of cobalt naphthenate drier. The solution on baking yielded a wrinkled almost opaque film. A similar solution containing 1 per cent of finely divided fiber glass yielded a film on baking which was opaque and wrinkled and which was hardly distinguishable from the film containing no glass. The film, however, was harder.

Fiber glass may also be added to the resin ingredients and the entire mass polymerized. Depending on the resin ingredients the glass may or may not exercise a catalytic effect on the resin.

*Example 8.*—To 100 parts of vinyl acetate solution containing a trace of benzoyl peroxide was added 1 part of fiber glass and the mixture heated on a steam bath under reflux. A semi-soft polymer of polyvinyl acetate resulted in which glass fiber was suspended.

*Example 9.*—One part of phenol was dissolved in 2 parts of aqueous 40 per cent formaldehyde solution. To this solution 3 parts of glass were added, glass which had been ground in a ball mill. The mixture was heated for 2 hours at 100° C., subjected to vacuum evaporation to remove water and the resulting glass-resin composition poured into a glass mold and cast at 70° C. for 5 days. A pink opaque casting resulted which was extremely hard. The resin casting on removing from the mold had a high surface luster.

A similar reaction product of phenol-formaldehyde which contained 10 per cent of glass, finely divided, which was treated with lactic acid before vacuum evaporation yielded a white opaque casting or a dark-colored molding.

It may be seen from these examples that a wide diversity of resins may be made amenable to treatment with glass. The glass moreover may be in fiber form, in granulated form, in a very short fibrous form, or may even be of colloidal dimensions.

Depending upon the type of resin used, a wide variety of effects may be obtained, from a textured finish to a clear resin mass in which the glass is macroscopically invisible. Moreover, depending on the colors of the resin and the glass a very wide diversity of decorative effects may result. Where colors are used, in each instance the glass should preferably have to be more highly colored than the resin to allow of the most pleasing appearance.

In order to secure complete invisibility or disappearance of the glass fibers it appears to be necessary to match the index of refraction not merely to the third decimal place but to the fourth decimal place. This is a degree of refinement which is difficult but can be accomplished when complete invisibility or substantial invisibility is desired. By invisibility I refer, of course to the effect on the eye rather than to that secured by magnification. If the index of refraction agrees to the third decimal place such agreement tends to make the fiber less noticeable, although still visible to the eye. Thus any degree of prominence or lack of prominence of the glass fiber may be secured by a variation in the index of refraction from that of glass through an amount merely that of a change in the fourth decimal place of the index of refraction. Of course there is no objection when it is desired to have the glass fiber show in a very prominent way to a greater degree of dissimilarity in the index of refraction figure, but for variation from visibility to invisibility when one seeks to obtain the strengthening and reenforcing effect of glass fiber without causing it to be too prominent or to obstruct light transmissivity to an objectionable degree a condition in the binder so far as light diffraction is concerned represented by only a slight disparity in the index of refraction of the glass fiber and the binding agent is desirable.

Thus by applying to a pane of glass a coating consisting of or containing fiber glass and an appropriate binder a product may be obtained which is somewhat of the ground glass type or substantially non-transparent form which at the same time possesses relatively high transmissivity for light. The product would in such case consist of a pane of glass carrying a coating comprising fiber glass and a binder having an index of refraction approximating to but slightly differing from that of the fiber glass.

To protect such coating from injury a second sheet of glass may be superposed on the coating applied to the supporting glass pane, producing a duplex glass pane or sandwich glass which may be of the ground glass type or of the more transparent type possessing a high transmissivity for light according as the index of refraction of the fiber glass and that of the binder has been adjusted to meet requirements.

In other words, a duplex glass pane of the ground glass or substantially non-transparent type is obtained which possesses said relatively high transmissivity for light and which comprises two panes of glass (or more if required) carrying an interposed layer comprising fiber glass and a binder having an index of refraction approximating to but slightly differing from that of the fiber glass.

By the same token the process involved would consist in such case of that of producing a fiber glass containing plastic material in films or as thick solid masses, as the case may be, which comprises embedding fiber glass stock in a plastic body having an index of refraction approximating to but slightly differing from that of the fiber glass. As a variant of such procedure the composition may be non-translucent but substantially transparent owing to the close approximation of index of refraction.

Furthermore a process results which involves the variation in light transmissivity of glass and which comprises applying to the surface of such glass a composition containing fiber glass and a strong binder and in varying the composition of said binder within a narrow range of index of refraction whereby the glass fiber contained in such composition is caused to range from visible to invisible.

In some cases it may be desirable to produce a duplex or laminated glass by the employment of a net of fiber glass made from fibers of the glass of suitable size or of a suitable number of strands which could be supported between two sheets of glass by a medium such as a binder of nitrocellulose, cellulose acetate or other cellulose ester or suitable cellulose ethers, drying oils or mixtures of drying oils, synthetic resins and the like. By making the index of refraction of the binder medium equal to that of the fiber glass, including an equality ranging through to the fourth decimal place of index of refraction, a substantial degree of invisibility is secured together with the strengthening effect of the glass fiber tape, cord or other woven structure so laid down in the film or coating.

It should be noted that fiber glass spun from various glass stocks such as crown glass, flint glass and the like will vary considerably in strength and flexibility depending upon the manner of drawing and spinning the fibers. As a rule, however, the glass fiber can be produced of great strength, that is, of a strength such that it exceeds that of many textile fabric fibers. This makes possible, therefore, the strengthening of a structural wall of, for example, ordinary glass and for the procurement of various decorative effects as, for example, by admixing in a rough way masses of fiber made from colored glass to obtain variegated or multicolored patterns possessing the desired color or tinted effect.

Conversely, the woven fiber glass may be coated with cellulose esters, cellulose ethers, drying oils, synthetic resins and the like without support between glass plates.

What I claim is:

1. A glass pane of the ground-glass—or substantially nontransparent—type yet possessing relatively high transmissivity for light which comprises a pane of light transmitting glass carrying a light transmitting composite coating comprising fiber glass and a light transmitting binder having an index of refraction approximating to but slightly differing from that of the fiber glass.

2. A duplex glass pane of the ground-glass—or substantially nontransparent—type yet possessing relatively high transmissivity for light which comprises two panes of light transmitting glass carrying an interposed layer of a light transmitting composite body comprising fiber glass and a light transmitting binder having an index of refraction approximating to but slightly differing from that of the fiber glass.

3. A glass article comprising a pane of light transmitting glass carrying a composite coating of a light transmitting resinous material containing fiber glass, the said resinous material having an index of refraction substantially the same as that of the fiber glass.

4. An article of manufacture including a shaped mass of fiber glass and a light transmitting binder having an index of refraction approximating to but slightly differing from that of the fiber glass, and a plasticizer capable of modifying the visual characteristics of the said mass by bringing the index of refraction of the binder into accord with that of the glass.

5. A laminated glass containing at least two panes of light transmitting glass bonded together by a composite light transmitting glass-resinous material composition, the resinous composition having substantially the same index of refraction as the glass.

CARLETON ELLIS.